United States Patent [19]

Guentherberg et al.

[11] Patent Number: 5,373,060
[45] Date of Patent: Dec. 13, 1994

[54] PARTICULATE GRAFT COPOLYMER

[75] Inventors: Norbert Guentherberg, Speyer; Wolfgang Fischer, Ludwigshafen; Norbert Niessner, Friedelsheim, all of Germany

[73] Assignee: BASF Aktiengesellschaft, Ludwigshafen, Germany

[21] Appl. No.: 85,907

[22] Filed: Jul. 6, 1993

[30] Foreign Application Priority Data

Jul. 15, 1992 [DE] Germany ............... 4223202

[51] Int. Cl.$^5$ ............... C08F 265/02; C08F 265/04; C08F 279/02; C08L 51/04
[52] U.S. Cl. ............... 525/301; 525/279; 525/281; 525/289; 525/293; 525/308; 525/309; 525/310; 525/316; 525/84; 525/78
[58] Field of Search ............... 525/279, 281, 289, 293, 525/301, 308, 309, 310, 316

[56] References Cited

U.S. PATENT DOCUMENTS

| | | |
|---|---|---|
| 3,055,859 | 9/1962 | Vollmert . |
| 4,612,347 | 9/1986 | Eichenauer et al. . |
| 4,668,737 | 5/1987 | Eichenauer et al. . |
| 5,180,786 | 1/1993 | Era et al. ............ 525/281 |
| 5,206,299 | 4/1993 | Oshima et al. ............ 525/305 |

FOREIGN PATENT DOCUMENTS 3149046 6/1983 Germany .
3405938 8/1985 Germany .

*Primary Examiner*—Vasu S. Jagannathan
*Attorney, Agent, or Firm*—Keil & Weinkauf

[57] ABSTRACT

A particulate graft polymer A of
A1: a grafting base based on a polydiene rubber A1 of, based on A1,
A11: 70 to 100% by weight of a polymerizable diene, and
A12: up to 30% by weight of a copolymerizable, ethylenically unsaturated monomer having a first graft sheath A2 of, based on A2,
A21: 75 to 99.8% of at least one $C_1$-$C_8$alkyl acrylate A21,
A22: 0.1 to 5% by weight of at least one polyfunctional, crosslinking monomer A22,
A23: 0.1 to 20% by weight of at least one monomer A23 containing one or more acidic or basic groups, and a second graft sheath A3 comprising, based on A3,
A31: 40 to 89.9% by weight of at least one aromatic vinyl monomer A31,
A32: 10 to 49.9% by weight of at least one polar, ethylenically unsaturated monomer A32,
A33: 0.1 to 20% by weight of at least one monomer A33 containing one or more basic or acidic groups, and
A34: up to 5% by weight of at least one polyfunctional, crosslinking monomer A34,
A23 and A33 in each case being different groups.

1 Claim, No Drawings

PARTICULATE GRAFT COPOLYMER

The invention relates to particulate graft copolymers that are suitable as a rubber component for thermoplastic molding materials having a reduced surface gloss, good weathering resistance and good low-temperature strength.

Polymer materials having a matt surface are becoming increasingly important in a very wide range of applications, for example in automobile interior parts, where glare-free surfaces are required that are at the same time extremely tough even at low temperatures.

It is known that both acidic and basic monomers can be incorporated in the sheath of a graft rubber in order to produce matt surfaces (DE-A 3,421,353).

DE 3,405,938 describes the use of graft polymers having acidic groups in a basically modified thermoplastic matrix. DE 4,011,163 describes the use of an acidic monomer in the rubber core with the simultaneous incorporation of a basic monomer in the graft sheath. Although such polymers have a relatively matt surface, the low-temperature strength when using acrylate-based rubbers is however not sufficient for all applications. If a polydiene rubber is used for the production of matt products according to the disclosures of DE 4,011,163, products which do have a better low-temperature strength but only a moderate weathering resistance, are obtained; on account of the relatively long polymerization time and the relatively pronounced susceptibility to undergo coagulation, these products too cannot be produced sufficiently economically.

DE 3,149,046 describes graft rubbers having a core-shell structure, though without acid/base modification.

It is an object of the present invention to provide a graft rubber that can be used to obtain matt products having a better low-temperature strength and good weathering resistance, and which can be produced more efficiently and cheaply.

We have found that this object is achieved by the use of a multistage-construction graft rubber having a polydiene rubber core—if desired copolymerized with up to 30% by weight of a further monomer—provided with a first graft sheath of a $C_1$-$C_8$acrylate rubber that contains up to 20% by weight of a comonomer having either acidic or basic groups, and with a second graft sheath of SAN which, based on the second graft sheath, contains up to 20% by weight of a copolymerizable base, so that the two graft sheaths in each case have different (acidic/basic) functional groups.

The immediate subject matter of the invention is accordingly a particulate graft polymer A of A1: a grafting base based on a polydiene rubber A1 of, based on A1, A11: 70 to 100% by weight of a polymerizable diene, and A12: up to 30% by weight of a copolymerizable, ethylenically unsaturated monomer provided with a first graft sheath A2 of, based on A2, A21: 75 to 99.8% of at least one $C_1$-$C_8$alkyl acrylate A21, A22: 0.1 to 5% by weight of at least one polyfunctional, crosslinking monomer A22, A23: 0.1 to 20% by weight of at least one monomer A23 containing one or more acidic or basic groups, provided with a second graft sheath A3 comprising, based on A3, A31: 40 to 89.9% by weight of at least one aromatic vinyl monomer A31, A32: 10 to 49.9% by weight of at least one polar, ethylenically unsaturated monomer A32, A33: 0.1 to 20% by weight of at least one monomer A33 containing one or more basic or acidic groups, and A34: up to 5% by weight of at least one polyfunctional, crosslinking monomer A34, A23 and A33 in each case being different groups, and molding materials prepared therefrom.

The following in particular may be said regarding the composition of the molding materials according to the invention and their preparation:

Component A

As graft core, a rubber latex is first of all prepared in a conventional way. The base rubber is defined by its glass transition temperature, which should be below $-40°$ C., preferably below $-60°$ C. Suitable monomers A11 are conjugated dienes having 4 to 5 carbon atoms, butadiene alone preferably being used.

The polymerization of the monomers A11 or their mixtures with A12 is carried out, as is usual, at from 30° to 90° C., in the presence of emulsifiers, for example alkali metal salts of alkyl sulfonates or alkylaryl sulfonates, alkyl sulfates, fatty alcohol sulfonates or fatty acids having 10 to 30 carbon atoms; preference is given to sodium salts of alkyl sulfonates or fatty acids having 12 to 18 carbon atoms. The emulsifiers are used in amounts of from 0.3 to 5, in particular from 1.0 to 2.0% by weight, based on the monomers. The conventional buffer salts, such as sodium bicarbonate and sodium pyrophosphate, are used.

Also, the customary initiators such as persulfates or organic peroxides together with reducing agents are used, and also if desired molecular weight regulators such as mercaptans, terpinols or dimeric α-methylstyrene, which are added at the beginning or during the polymerization. The weight ratio of water to monomers is preferably between 2:1 and 1:1. The polymerization is continued until more than 90%, preferably more than 96% of the monomers are polymerized. This conversion is generally reached after 4 to 20 hours. The resultant rubber latex has a particle size of less than 0.15 μm, preferably between 0.06 and 0.10 μm. This size specification refers to the $d_{50}$ value of the cumulative weight distribution, which can be determined for example by ultracentrifugation or by counting particles on electron-microscope photographs. The particle size distribution of such rubber latices is relatively narrow, giving an almost monodisperse system.

The rubber latex is then agglomerated in a known way, for example according to the disclosures given in DE 2,427,960. This is achieved for example by adding a dispersion of an acrylic ester polymer. Preferably dispersions of copolymers of acrylic esters of alcohols having 1 to 4 carbon atoms, preferably ethyl acrylate, with 0.1 to 10% by weight of monomers forming water-soluble polymers, for example acrylic acid, methacrylic acid, acrylamide or methacrylamide, N-methylolmethacrylamide or N-vinylpyrrolidone, are used. Particularly preferred is a copolymer of 96% of ethyl acrylate and 4% of methacrylamide. The agglomeration dispersion may if desired also contain two or more of the aforementioned acrylic ester polymers.

The concentration of the acrylic ester polymers in the dispersion should generally be from 3 to 40% by weight. In the agglomeration 0.2 to 20, preferably 1 to 5 parts by weight of the agglomeration dispersion are used per 100 parts of the rubber latex, in each case calculated as solids. The agglomeration is carried out by adding the agglomeration dispersion to the rubber. The rate of the addition is normally not critical, but generally lasts about 1 to 30 minutes at from 20° to 90° C., preferably from 30° to 75° C.

Under the above conditions only part of the rubber particles is agglomerated, with the result that a bimodal or broad distribution is obtained. After the agglomeration in general more than 50, preferably between 75 and 95% of the particles (numerical distribution) are present in the non-agglomerated state. The median diameter of the rubber particles ($d_{50}$ value of the cumulative weight distribution) is between 0.16 and 0.45 $\mu$m, preferably between 0.20 and 0.35 $\mu$m. The resulting agglomerated rubber latex is relatively stable, so that it can be stored and transported without any difficulty and without coagulating.

First graft sheath A2

The agglomerated rubber latex A1, which contains mainly polybutadiene, is provided in a first stage with an alkyl polyacrylate shell containing acidic groups.

The proportion of the shell is 5 to 60% by weight, preferably 10 to 40% by weight, in each case based on A1 and A2. The proportion of the elastomer component A1, i.e. the proportion of the core, is calculated from A2=100.

The elastomeric shell A2 is built up from 75 to 99.8% by weight, based on A2, of at least one ester of acrylic acid with an alcohol having 1 to 8 carbon atoms (A21) and 0.1 to 5% by weight of at least one polyfunctional monomer (A22) and also 0.1 to 20% by weight of at least one monoethylenically unsaturated monomer (A23) having one or more acidic groups.

In order to prepare this elastomeric shell A2, 40 to 95% by weight, preferably 60 to 90% by weight, of at least one alkyl acrylate having 1 to 8, preferably 2 to 8 carbon atoms in the alkyl radical (A21), if desired a further copolymerizable monomer (A24) such as styrene, α-methylstyrene, acrylonitrile, methyl methacrylate or vinyl methyl ether, 0.1 to 5% by weight, preferably 0.5 to 3% by weight, of a copolymerizable polyfunctional monomer (A22) such as divinylbenzene, diallyl maleate, diallyl phthalate, tricyclodecenyl acrylate, triallyl cyanurate, and 0.5 to 10% by weight of an acidic or basic monomer are polymerized in the presence of 5 to 60%, preferably 10 to 40% by weight, of the agglomerated rubber latex (based on the solids content). Preferred monomers (A21) are mixtures of butyl acrylate or ethylhexyl acrylate and tricyclodecenyl acrylate.

As acidic monomers (A23) there may be used for example vinyl compounds bearing carboxylic acid groups or sulfonic acid groups.

Preferred acidic monomers (A23) are α,β-unsaturated carboxylic acids such as acrylic acid or methacrylic acid, and also citraconic acid, crotonic acid, fumaric acid, itaconic acid, maleic acid, vinylsulfonic acid, vinylbenzenesulfonic acid, vinylphosphoric acids or cinnamic acid. Methacrylic acid is particularly preferred.

As basic monomers (A23), the compounds mentioned hereinafter for (A33) may be used if desired.

The comments made hereinbefore regarding the preparation of the rubber latex also apply to the emulsion polymerization.

Graft sheath A3

In order to prepare the graft sheath A3 of the graft copolymer, a monomer mixture comprising 40 to 89.9% by weight of at least one aromatic vinyl monomer A31, 10 to 49.9% by weight of at least one polar, ethylenically unsaturated monomer A32 and 0.1 to 20% by weight of at least one monomer A33 containing one or more basic or acidic groups and also up to 5% by weight of at least one polyfunctional, crosslinking monomer A34, which mixture comprises the second graft sheath, is then applied in the presence of the resultant latex of the crosslinked acrylic acid ester polymer, which contains a polybutadiene core, particular preference being given to a monomer mixture A31/A32 of styrene and acrylonitrile in a ratio of 75:25 to 70:30. This graft copolymerization of styrene, acrylonitrile and copolymerizable base or acid on the crosslinked polyacrylic acid ester polymer serving as grafting base is likewise advantageously carried out in aqueous emulsion under the normal conditions specified above. The graft copolymerization may be performed in the same system as the preparation of the graft sheath A2, and further emulsifier and initiator may be added if necessary. The monomer mixture of styrene and acrylonitrile to be grafted on may be added to the reaction mixture all at once, in batches in several stages, or preferably continuously during the polymerization. The graft copolymerization is performed so as to achieve a degree of grafting of from 25 to 45, preferably from 30 to 40% by weight. Since the graft yield in the graft copolymerization is incomplete, a somewhat larger amount of the monomer mixture of styrene and acrylonitrile than that which corresponds to the desired degree of grafting must be used. The control of the graft yield in the graft copolymerization and thus the degree of grafting of the finished graft copolymer is known to any person skilled in the art and may be achieved for example by adjusting the metering rate of the monomers or by adding regulators (Chauvel, Daniel, ACS Polymer Preprints 15 (1974), p. 329 ff.). In general about 5 to 15% by weight, based on the graft copolymer, of free, ungrafted styrene/acrylonitrile copolymer is formed in the emulsion graft copolymerization.

Apart from styrene and acrylonitrile, α-methylstyrene, methyl methacrylate, alkyl acrylates or vinyl methyl ether, among others, may also be used as graft monomers. If desired the graft sheath may also contain small amounts of a copolymerizable, polyfunctional crosslinking monomer such as divinylbenzene, diallyl phthalate, triallyl cyanurate and/or diallyl maleate.

As examples of basic monomers A33, the following may be mentioned: dimethylaminoethyl (meth)acrylate, morpholine methacrylate, N-vinylimidazole, p-dimethylaminostyrene, N-vinylcarbazole, 3-vinylpyridine, 4-vinylpyridine, and also mixtures thereof. Particularly preferred monomers are esters of acrylic acid or methacrylic acid with aliphatic alcohols that contain a tertiary amino group in the alkyl radical.

It is understood that, in the same way, A23 too may be a polymerizable base instead of an acid, in which case A33 is then a corresponding polymerizable acid. However, the first-mentioned combination is preferred.

The graft copolymers according to the invention are advantageously mixed with a hard phase (B) in an amount of 10 to 150 parts by weight, preferably 20 to 140 parts by weight, based on 100 parts by weight of A. This hard phase (hard component) may be built up from one or more copolymers of styrene and/or α-methylstyrene with acrylonitrile, methacrylonitrile, methyl methacrylate and/or acrylonitrile.

The acrylonitrile content in these copolymers of the hard component should not exceed 20 to 40% by weight.

This hard component also includes the free, ungrafted styrene/acrylonitrile copolymers formed in the graft copolmerization for the preparation of the component A3. Depending on the conditions selected in the graft copolymerization for the preparation of the graft copolymer A3, the situation may arise that a sufficient proportion of hard component has already been formed in the graft copolymerization.

In general however it will be necessary to mix the products obtained in the graft copolymerization with additional, separately prepared hard component.

This additional, separately prepared hard component B may be a styrene/acrylonitrile copolymer, an α-methylstyrene/acrylonitrile copolymer, or an α-methylstyrene/styrene/acrylonitrile tarpolymer. Similarly, styrene/acrylonitrile/methyl methacrylate or styrene/acrylonitrile/acrylamide terpolymers or even styrene/methyl methacrylate copolymers may be used, in which case the methyl methacrylate proportion should not exceed 20 to 40% by weight, based on the hard component. These copolymers may be used individually or else as a mixture for the hard component, and accordingly the additional, separately prepared hard component of the mixtures according to the invention may for example be a mixture of a styrene/acrylonitrile copolymer and an α-methylstyrene/acrylonitrile copolymer. In the case where the hard component B of the molding materials according to the invention comprises a mixture of a styrene/acrylonitrile copolymer and an α-methylstyrene/acrylonitrile copolymer, the acrylonitrile content of the two copolymers should if possible differ by not more than 10% by weight, preferably by not more than 5% by weight, based on the copolymer. The hard component of the molding materials according to the invention may however comprise only one single styrene/acrylonitrile copolymer, namely in the case where the same monomer mixture of styrene and acrylonitrile is used as starting material in the graft copolymerizations for the preparation of the component A3 and also in the preparation of the additional, separately prepared hard components.

The additional, separately prepared hard component may be obtained by conventional methods. For example, the copolymerization of the styrene and/or α-methylstyrene with the acrylonitrile may be performed in bulk, solution, suspension or aqueous emulsion. The hard component preferably has a molecular weight, expressed in terms of the viscosity number VN, of from 40 to 100, in particular from 50 to 80.

The molding material according to the invention may also contain conventional additives in effective amounts.

Such additives are for example pigments, dyes, fillers, flameproofing agents, compatible polymers, anti-statics, antioxidants and lubricants.

It has been found that the matt molding materials according to the invention combine the properties predetermined by the polybutadiene and the acid-modified polyalkyl acrylate shell, without any deterioration in weathering resistance and aging resistance due to the relatively high proportion of polybutadiene. The molding materials according to the invention thus combine a high toughness, even at low temperatures, a high rigidity and an excellent weathering and aging resistance with a matt surface, as is demonstrated in the following examples.

The molding materials according to the invention can be processed by the conventional methods used for thermoplastics, such as extrusion and injection molding, into a wide range of molded articles such as garden furniture, automobile interior parts, boats, signboards, streetlamp covers and children's toys. As already mentioned, the molding materials according to the invention are particularly suitable for producing colored matt molded parts or molded articles of the aforementioned type, such as are employed in particular in garden chairs, automobile parts and consumer goods.

The parameters described in the examples and comparative tests were determined as follows:

The notched impact strength [in $kJ/m^2$] was measured at 23 and −40° C. on small standard bars injection molded at a melt temperature of 250° C., in accordance with DIN 53453.

For the gloss measurements, the molding materials according to the invention were molded into roundels in an Allrounder injection molding machine from Arburg, at a melt temperature of 250° C. The gloss measurements were carried out according to DIN 67530 with a Dr. Lange UME 1 reflectometer under an incident beam angle of 45°.

The invention is described in more detail with the aid of the following examples. The parts and percentages mentioned in the examples are by weight unless otherwise stated.

EXAMPLE 1

The following products were charged to a V2A steel vessel equipped with a paddle stirrer and designed to withstand a pressure of 10 bar:

150 parts of water
1.2 parts of the sodium salt of a $C_{12}$–$C_{18}$ paraffin-sulfonic acid
0.3 part of potassium persulfate
0.3 part of sodium bicarbonate
0.15 part of sodium pyrophosphate The vessel was flushed twice with nitrogen in order to remove the oxygen and the solution was then heated to 65° C. in the nitrogen atmosphere. 0.5 part of tert-dodecyl mercaptan and 16.6 parts of butadiene were then added to the solution. One hour after the start of the polymerization a further 83.3 parts of butadiene were metered in within 5 hours. A further 0.5 part of tert-dodecyl mercaptan was added 5 hours after the end of the butadiene addition, is after a total of 11 hours. After a total reaction time of 19 hours a polybutadiene emulsion having a solids content of 39.2% based on the emulsion was obtained in a conversion of 96%. The polybutadiene latex had a glass transition temperature of about −80° C. and a median particle size of 0.08 μm ($d_{50}$ value of the cumulative weight distribution, determined by means of ultracentrifugation).

255 parts of the polybutadiene emulsion were diluted at 65° C. with 74 parts of water. In order to agglomerate the latex, 30 parts of an aqueous dispersion of an ethyl acrylate copolymer containing (in copolymerized form) 96% by weight of ethyl acrylate and 4% by weight of methacrylamide were metered in. The solids content of this dispersion was 10% by weight, based on the dispersion. After the agglomeration a polybutadiene latex was obtained in which about 80% (numerically) of the particles were in a non-agglomerated state.

The cumulative weight distribution, which was determined by means of ultracentrifugation, exhibited a broad distribution having the following bimodal character:

$d_{50}$ value: 0.081 μm
$d_{50}$ value: 0.238 μm
$d_{90}$ value: 0.331 μm

The agglomerated polybutadiene emulsion obtained in this way was then processed further as follows:

0.12 part of emulsifier and 0.1 part of potassium persulfate were added, after addition of 80 parts of water, to 30 parts of the latex thus obtained. 30 parts of a mixture of 96.4 parts of butyl acrylate, 2 parts of methacrylic acid and 1.6 parts of dicyclopentadienyl acrylate were then added within 2 hours. After the end of the addition the reaction mixture was stirred for a further 2 hours at 65° C.

After adding a further 0.025 part of potassium persulfate, 40 parts of a mixture of 75 parts of styrene, 23.4 parts of acrylonitrile and 1.6 parts of dimethylaminoethyl acrylate were metered into the resulting dispersion over 2.5 hours. After the end of the addition the reaction mixture was stirred for a further 2 hours at 65° C.

COMPARATIVE TEST

The same quantitative amounts were used for the comparative test, except that in the first stage methacrylic acid was replaced by butyl acrylate, and in the second stage dimethylaminoethyl acrylate was replaced by acrylonitrile.

Preparation of the impact-resistant molding material

The prepared dispersions were precipitated with magnesium sulfate solution, washed with deionized water, dewatered, and mixed with the hard matrix in a twin-screw extruder at 250° C.

The hard matrix comprised a styrene/acrylonitrile copolymer containing 35% by weight of acrylonitrile and having a viscosity number of 80 ml/g. The quantitative amounts were chosen so that the hard matrix contained 25% by weight of graft rubber.

|  | Notched impact strength [kJ/m$^2$] | | Gloss |
|---|---|---|---|
|  | at 23° C. | at −40° C. | % |
| Example | 11 | 4 | 65 |
| Comparative test | 12 | 5 | 23 |

We claim:
1. A particulate graft polymer A of A1:
a grafting base based on a polydiene rubber A1 of, based on A1,
A11: 70 to 100% by weight of a polymerizable diene, and
A12: up to 30% by weight of a copolymerizable, ethylenically unsaturated monomer having a first graft sheath A2 of, based on A2,
A21: 75 to 99.8% of at least one $C_1$–$C_8$-alkyl acrylate A21,
A22: 0.1 to 5% by weight of at least one ethylenically unsaturated polyfunctional, crosslinking monomer A22,
A23: 0.1 to 20% by weight of at least one ethylenically unsaturated monomer A23 containing one or more acidic or basic groups, and a second graft sheath A3 comprising, based on A3,
A31: 40 to 89.9% by weight of at least one aromatic vinyl monomer A31,
A32: 10 to 49.9% by weight of at least one polar, ethylenically unsaturated monomer A32,
A33: 0.1 to 20% by weight of at least one ethylenically unsaturated monomer A33 containing one or more basic or acidic groups, and
A34: up to 5% by weight of at least one ethylenically unsaturated polyfunctional, crosslinking monomer A34,
A23 and A33 in each case being different groups.

* * * * *